(12) United States Patent  (10) Patent No.: US 7,159,682 B2
Arnold  (45) Date of Patent: Jan. 9, 2007

(54) MOTORCYCLE WITH IMPROVED THERMOSTAT MOUNTING

(75) Inventor: David W. Arnold, Glendale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 421 days.

(21) Appl. No.: 10/877,536

(22) Filed: Jun. 24, 2004

(65) Prior Publication Data

US 2005/0284677 A1    Dec. 29, 2005

(51) Int. Cl.
    B62M 7/00    (2006.01)
(52) U.S. Cl. ...................... 180/229; 180/68.4
(58) Field of Classification Search ............... 180/229, 180/219, 68.4; 123/41.05; 165/41
    See application file for complete search history.

(56) References Cited

U.S. PATENT DOCUMENTS

| 4,237,996 | A | 12/1980 | Matsuda et al. |
| 4,421,195 | A | 12/1983 | Aiba |
| 4,640,341 | A | 2/1987 | Ozawa |
| 5,131,357 | A | 7/1992 | Inoue et al. |
| 5,176,111 | A | 1/1993 | Nakamura et al. |
| 5,390,758 | A | 2/1995 | Hunter et al. |
| 5,476,077 | A | 12/1995 | Nishio |
| 5,884,587 | A | 3/1999 | Ichihara |
| 6,125,811 | A | 10/2000 | Koriyama et al. |
| 6,199,516 | B1 | 3/2001 | Katayama |
| 6,213,063 | B1 | 4/2001 | Nakano et al. |
| 6,260,515 | B1 | 7/2001 | Tosaka et al. |
| 6,332,505 | B1 | 12/2001 | Tateshima et al. |
| 6,382,169 | B1 | 5/2002 | Gausman |
| 6,446,586 | B1 | 9/2002 | Fukamachi |
| 6,505,581 | B1 | 1/2003 | Niizuma et al. |
| 6,601,667 | B1* | 8/2003 | Buell et al. ................. 180/229 |
| 6,644,261 | B1 | 11/2003 | Morii et al. |
| 7,077,230 | B1* | 7/2006 | Arnold ........................ 180/229 |
| 2001/0035138 | A1 | 11/2001 | Fukamachi |
| 2002/0112680 | A1 | 8/2002 | Oki et al. |
| 2002/0195289 | A1 | 12/2002 | Schneider et al. |
| 2003/0000755 | A1* | 1/2003 | Schroeder ................... 180/229 |
| 2003/0066697 | A1 | 4/2003 | Kodan et al. |
| 2005/0263110 | A1* | 12/2005 | Yasui ........................ 123/41.72 |
| 2005/0284680 | A1* | 12/2005 | Arnold ........................ 180/227 |

* cited by examiner

*Primary Examiner*—Anne Marie Boehler
(74) *Attorney, Agent, or Firm*—Rankin, Hill, Porter & Clark LLP; Christen Millard

(57) ABSTRACT

A motorcycle is provided having front and rear wheels. A chassis is supported on and connected to the front and rear wheels. An engine is mounted to the chassis and includes front and rear cylinder heads joined to an engine block. Front and rear mounting assemblies are provided for mounting the engine to the chassis. The rear mounting assembly includes a pair of laterally spaced-apart support plates secured between the engine and a top frame structure of the chassis. The support plates are disposed rearward of the rear cylinder head. A radiator is mounted to the chassis. A thermostat is connected between the engine and the radiator and is operable to control coolant flow from the engine to the radiator. The thermostat is disposed between the support plates.

20 Claims, 4 Drawing Sheets

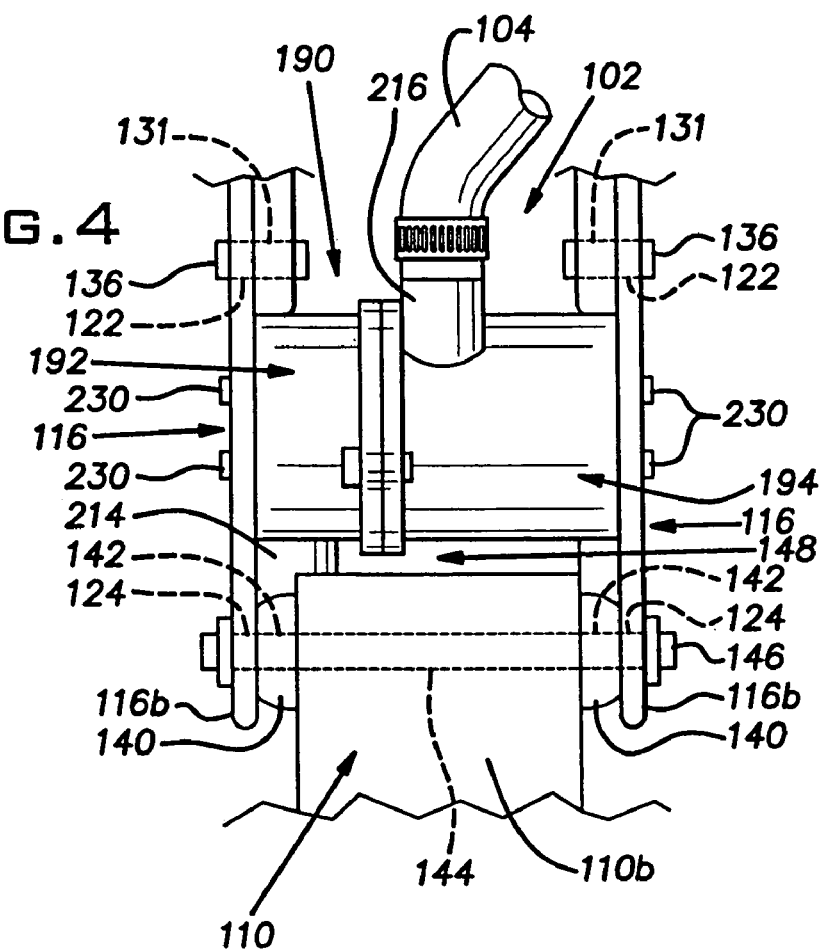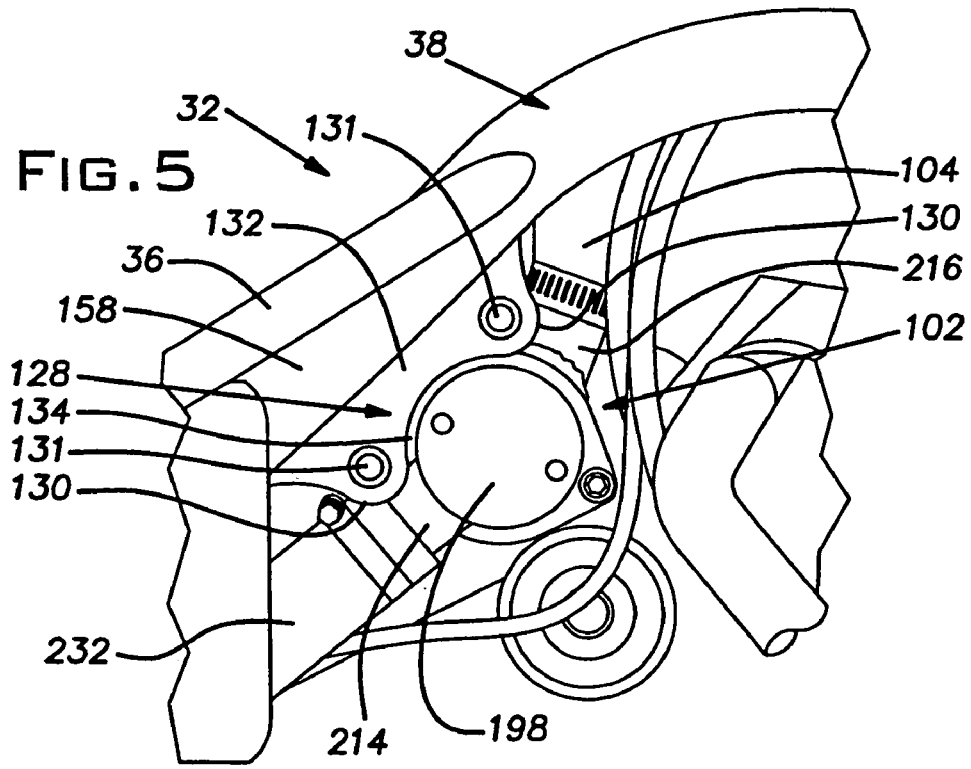

US 7,159,682 B2

MOTORCYCLE WITH IMPROVED THERMOSTAT MOUNTING

BACKGROUND OF THE INVENTION

The present invention is directed toward a cooling system for a vehicle and, more particularly, toward the mounting of a thermostat in a motorcycle.

Conventionally, a motorcycle comprises a chassis supported on front and rear wheels. An engine, a fuel tank and a cooling system, including a thermostat and a radiator, are mounted to the chassis. In certain types of motorcycle, such as cruisers, it is desirable to have an open chassis, i.e., a chassis that is not covered by body panels or extended fairings. In a motorcycle with an open chassis, it is desirable to provide the motorcycle with a clean and uncluttered appearance, wherein major mechanical components of the motorcycle, such as the engine, are prominently displayed, without being obstructed from view by other peripheral components of the motorcycle. Components of a motorcycle that tend to detract from such a clean and uncluttered appearance are the thermostat and other elements of the cooling system.

Conventionally, the radiator of a motorcycle is mounted in front of the engine, just behind a front fork to which the front wheel is rotatably mounted. The thermostat is connected to the radiator, the water pump and the engine by a plurality of rubber hoses that extend in different directions. In order to avoid having the thermostat and the hoses appear as an unsightly tangle, the mounting location for the thermostat is usually selected to minimize the visibility of the thermostat and the associated hoses. Often, the thermostat is covered by the fuel tank or is located proximate to the fuel tank. Examples of motorcycles having such thermostat mounting locations are shown in U.S. Pat. No. 4,237,996 to Matsuda et al., U.S. Pat. No. 4,640,341 to Ozawa, published U.S. Patent Application No. 2002/0195289A1 to Schneider et al., and published U.S. Patent Application No. 2003/0066697A1 to Kodan et al.

Based on the foregoing, there exists a need in the art for a motorcycle having an improved thermostat mounting, wherein the thermostat is concealed, but is not located in a cramped and difficult to access location. The present invention is directed to such a motorcycle.

SUMMARY OF THE INVENTION

In accordance with the present invention, a motorcycle is provided having a chassis supported on and connected to front and rear wheels. An engine is mounted to the chassis and has at least one cylinder head joined to an engine block. At least one mounting assembly for mounting the engine to the chassis is provided. The mounting assembly includes a pair of laterally spaced-apart support plates secured between the engine and the chassis. The support plates are disposed rearward of the rearward most one of the at least one cylinder head. A radiator is mounted to the chassis. A thermostat is connected between the engine and the radiator and is operable to control coolant flow from the engine to the radiator. The thermostat is disposed between the support plates. In one aspect of the present invention, the support plates are secured to a top frame structure of the chassis and extend downwardly therefrom. The support plates have lower portions secured to the rear mount and disposed on opposing sides of the rear mount. The support plates cooperate with the rear mount and the top frame structure to define a holding space that extends between the support plates and between the rear mount and the top frame structure. The thermostat is disposed in the holding space.

BRIEF DESCRIPTION OF THE DRAWINGS

The features, aspects, and advantages of the present invention will become better understood with regard to the following description, appended claims, and accompanying drawings where:

FIG. 4 is a front view of the thermostat mounted between rear support plates that help mount the engine to a chassis of the motorcycle;

FIG. 5 is a side view of a portion of the motorcycle, wherein one of the rear support plates has been removed to show the thermostat disposed adjacent to a top mount on the chassis;

DETAILED DESCRIPTION OF THE PREFERRED EMBODIMENTS

Figure 1:
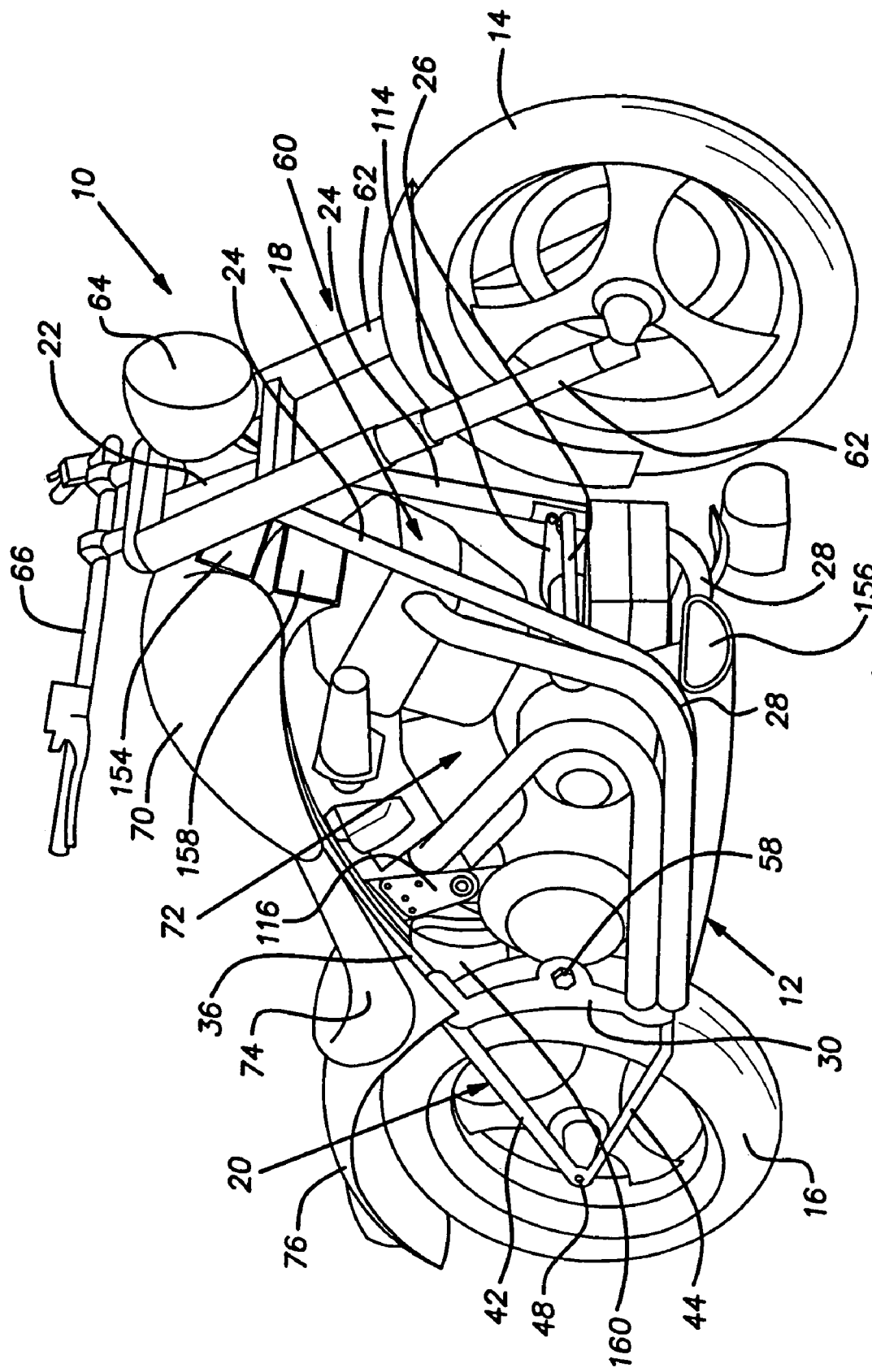
FIG. 1 is a front perspective view of a motorcycle having a cooling system embodied in accordance with the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The present invention is directed to a motorcycle comprising a cooling system having a thermostat with an improved mounting.

Referring now to FIG. 1, there is shown a motorcycle 10 which incorporates the cooling system of the present invention. The motorcycle 10 is a cruiser type motorcycle and comprises an open chassis 12 that is not covered by any body panels or an extended fairing. The chassis 12 is supported on front and rear wheels 14, 16 and includes a main frame or front frame 18 and a rear swing arm or swing frame 20. Although the motorcycle 10 is shown as being a cruiser and having a rear swing frame 20, it should be appreciated that the present invention is not limited to use in cruiser motorcycles having rear swing frames.

The front or main frame 18 includes a steering head 22 with a pair of spaced-apart down tube or pipes 24 extending downwardly and rearwardly therefrom. A laterally-extending cross bar 26 is joined between the down pipes 24. Lower portions of the down pipes 24 are joined at bends to a pair of bottom tubes or pipes 28 that extend rearwardly and are generally horizontally disposed. Rear portions of the bottom pipes 28 are fixed to a pair of rear stays 30. A top frame structure 32 (shown in FIG. 2) extends between the steering head 22 and the rear stays 30. As will be described more fully below, the top frame structure 32 may be comprised of a pair of seat rails 36 and a duct structure 38. The seat rails 36 are secured between the rear stays 30 and the duct structure 38.

Figure 6:
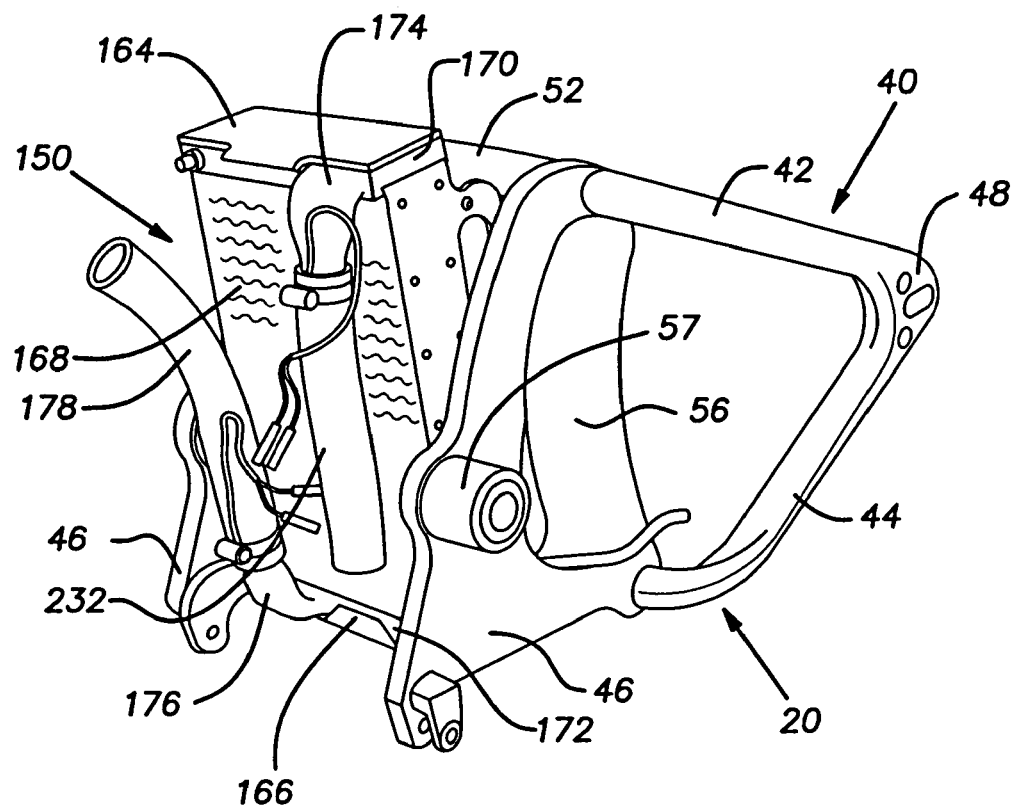
FIG. 6 is a front perspective view of a rear swing frame of the chassis, wherein a radiator of the cooling system is mounted to the rear swing frame.
Figure 7:
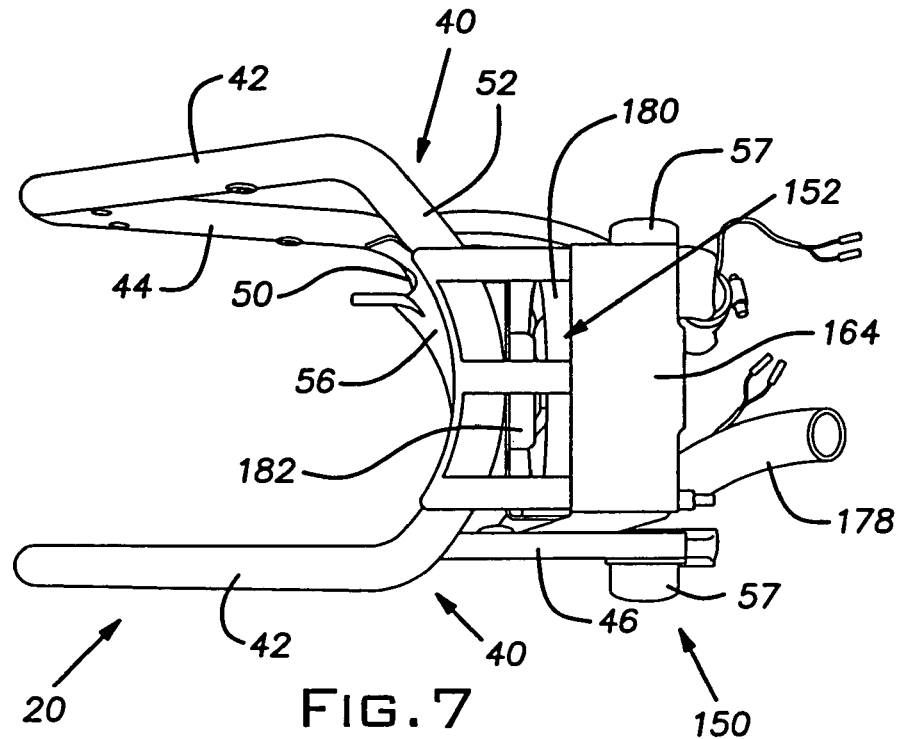
FIG. 7 is a top view of the rear swing frame and the radiator.

Referring now to FIGS. 6 and 7, the rear swing frame 20 has a generally triangular shape and includes a pair of generally triangular side structures 40, each of which includes a pair of upper and lower arms 42, 44 connected to a generally C-shaped forward mount 46. In each side structure 40, rearward ends of the upper and lower arms 42, 44 are joined together at a wheel mount 48 and forward portions of the upper and lower arms 42, 44 are joined to the forward mount 46. The upper and lower arms 42, 44 of each side structure 40 extend forwardly at acute angles to each other from the rear wheel mount 48 to the forward mount 46. The lower arms 44 are spaced apart and joined together by an arcuate transverse lower cross member 50, while the upper arms 42 are spaced apart and joined together by an arcuate transverse upper cross member 52. An arcuate shield plate or inner fender 56 having a rigid or semi rigid construction is preferably secured to the rear swing frame 20 and extends between the upper cross member 52 and the lower cross member 50 and between the side structures 40. The rear swing frame 20 is pivotally connected to the front or main frame 18 by a pivot axle 57 that extends between the forward mounts 46 and the rear stays 30. On each side of the rear swing frame 20, a pivot pin 58 (FIG. 1) extends through aligned passages in the rear stay 30 and the forward mount 46 and is received in the pivot axle 57.

Returning to FIG. 1, a front fork assembly 60 is rotatably connected to the steering head 22. The front fork assembly 60 comprises a pair of elongated fork legs 62 that extend downwardly and forwardly from the steering head 22. The front wheel 14 is rotatably connected between the lower ends of the fork legs 62. A headlight 64 is secured to the front fork assembly 60 and is disposed between the upper ends of the fork legs 62. Handle bars 66 are connected to the front fork assembly 60 for moving the same.

A fuel tank 70 is provided for supplying fuel to an engine 72, which is supported on the chassis 12. The fuel tank 70 is disposed over, and is secured to, the top frame structure 32, above the engine 72. A seat 74 is mounted to the seat rails 36 of the front or main frame 18 and is disposed rearwardly of the fuel tank 70. The seat 74 may extend over a rear fender 76 that is secured to fender supports (not shown). The rear wheel 16 is rotatably connected between the wheel mounts 48 of the rear swing frame 20. The rear wheel 16 is driven by the engine 72 through a transmission and suitable drive system known in the art. For example, the engine 72 may drive the rear wheel 16 through a transmission and a drive chain, a rotatable drive shaft, or an endless toothed drive belt, such as the belt designated with the reference numeral 78 in FIG. 2.

With the construction described above, the motorcycle 10 has a longitudinal plane about which the motorcycle 10 is generally laterally symmetrical. The longitudinal plane extends through the steering head 22 and the front and rear wheels 14, 16.

Figure 2:
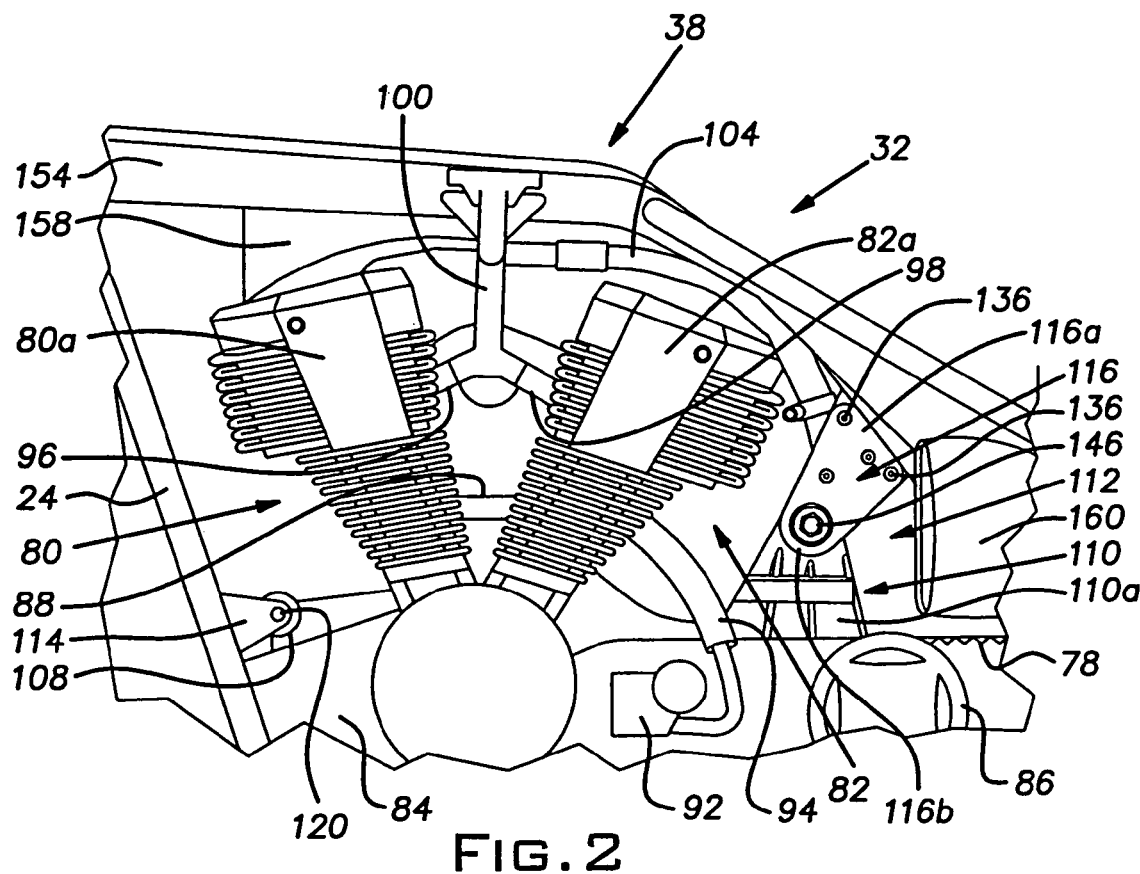
FIG. 2 is a side view of a portion of the motorcycle with several components removed to better show features of the cooling system and an engine of the motorcycle.

Referring now to FIG. 2, there is shown a side view of a left or drive side of the motorcycle 10, with components, such as the fuel tank 70, removed to better show features of the engine 72 and the cooling system. The engine 72 is secured to and supported by the front or main frame 18. The engine 72 is a multi-cylinder, liquid-cooled engine and includes an engine block 84, a front cylinder head 80a, and a rear cylinder head 82a. The cylinder block 84 includes front and rear cylinders 80, 82 disposed in a V-shaped configuration. Each of the front and rear cylinder heads 80a, 82a cover an associated front or rear cylinder 80, 82.

Each cylinder 80, 82 is surrounded by a water jacket (not shown). At least a portion of the water jacket extends through or contacts the cylinder heads 80a, 82a. Pistons (not shown) are movably disposed in the cylinders 80, 82 and are connected to a crankshaft (not shown) that drives a drive pulley 86 through the transmission. Naturally, the drive pulley could be replaced by a drive sprocket or a shaft assembly, as is known in the art. The water jackets of the front and rear cylinders 80, 82 are connected together by a pipe 88 or other means, preferably at a lower portion of the water jackets. The rear cylinder head 82a defines an inlet to the water jacket which is connected to a water pump 92 by a flexible hose 94. Each of the front and rear cylinder heads 80a, 82a include a water jacket outlet whereby coolant may exit the engine block 84 after flowing through the associated water jacket.

The water pump 92 is secured to the engine block 84, below the front and rear cylinders 80, 82. The water jacket outlets in the front and rear cylinder heads 80a, 82a are connected by flexible hoses 96, 98 to inlets of a multiport connector 100. An outlet of the multiport connector 100 is connected to a thermostat 102 by a flexible hose 104.

Coolant from the water pump 92 travels through the hose 94 and is introduced into the water jacket surrounding the rear cylinder 82 via the inlet provided in the rear cylinder head 82a, and then splits such that a portion of the coolant travels through the pipe 88 and into the water jacket surrounding the front cylinder 80. After passing through the water jackets of the front and rear cylinders 80, 82, the coolant exits through the outlets in the front and rear cylinder heads 80a, 82a and travels through the hoses 96, 98 to the multiport connector 100. From the multiport connector 100, the coolant travels through the hose 104 to the thermostat 102. As described more fully hereinafter, when the engine 102 is cold, the coolant is returned from the thermostat to the water pump 92 to be recirculated through the engine block (bypassing the radiator 150), whereas when the engine is warm or hot, coolant flows through the thermostat, then to the radiator 150, and then to the water pump 92 before being returned to the engine block.

The engine block 84 is provided with exterior front and rear mounts 108, 110 for mounting the engine 72 to the front or main frame 18. The front mount 108 is generally cylindrical in shape and has end surfaces that face outwardly on opposing sides of the motorcycle 10. The rear mount 110 has a rounded triangle shape and includes a lower base 110a joined to the engine block and a rounded upper end 110b. The rear mount 110 tapers gently inward as the rear mount 110 extends upwardly from the lower base 110a to the upper end 110b. A bore extends laterally through the upper end 110b of the rear mount 110. The front mount 108 is disposed forward of the front cylinder 80, while the rear mount 110 is disposed rearward of the rear cylinder 82. The engine 72 is vertically disposed between the bottom pipes 28 and the top frame structure 32 and is longitudinally disposed between the down pipes 24 and the rear stays 30. A rear portion of the engine 72 is spaced forwardly from the rear stays 30 and the inner fender 56. In this manner, a rear cooling space 112 is formed between the rear portion of the engine 72 and the inner fender 56.

The engine 72 is secured to the front frame by at least a pair of front support plates 114 and a pair rear support plates 116. Each front support plate 114 has a generally rounded triangular shape and includes a front portion with a pair of spaced-apart arms extending forwardly therefrom, and a rounded rear portion with an arcuate rear edge. Engine mounting openings are formed in the rear portions of the rear support plates. Each front support plate 114 gently tapers inward as the front support plate extends rearwardly from the front portion to the rear portion. The front portions of the front support plates 114 are secured to the down pipes 24, respectively, by bolts that extend through aligned openings in the arms of the front support plates 114 and the down pipes 24. The front mount 108 on the engine 72 is disposed between the rear portions of the front support plates. A pair of elastomer absorbers (not shown) with openings extending therethrough are disposed between end surfaces of the front mount 108 and inner surfaces of the front support plates 114, respectively, to dampen vibration from the engine 72. The engine mounting openings in the front support plates 114 and the absorbers are aligned with a bore in the front mount 108 so as to define a mounting passage. A bolt 120 extends through the mounting passage and is secured between the front support plates 114, thereby securing the front mount 108 of the engine 72 to the front support plates 114 and, thus, the down pipes 24.

Each rear support plate 116 has a generally rounded triangular shape and includes a rear portion 116*a* with a straight rear edge and a rounded forward portion 116*b* with an arcuate forward edge. Each rear support plate 116 gently tapers inward as the rear support plate 116 extends downwardly and forwardly from the rear portion 116*a* to the forward portion 116*b*. The rear support plates 116 each have a pair of frame mounting openings 122 (shown in phantom in FIG. 4) and an enlarged engine mounting opening 124 (shown in phantom in FIG. 4) formed therein. The frame mounting openings 112 are disposed toward the rear edge, while the engine mounting opening 124 is disposed toward the forward edge. At least a pair of securement holes are also formed in each rear support plate 116. The rear portions 116*a* of the rear support plates 116 are secured to a pair of top mounts 128 on the top frame structure 32, respectively.

Referring now to FIG. 5, the top mounts 128 are laterally spaced apart and are joined to the top frame structure 32 by welding or otherwise. More specifically, the top mounts 128 may be welded or otherwise joined to the duct structure 38 forming the top frame structure 32. The top mounts 128 extend forwardly and downwardly. Each top mount 128 includes a pair of arcuate tabs 130 with openings 131 formed therein. In each top mount 128, the tabs 130 are joined together by a bridging portion 132 that cooperates with the tabs 130 to define a substantially semi-circular recess 134, which is disposed between the tabs 130 and opens downwardly and forwardly.

Referring now to both FIG. 2 and FIG. 5, the rear support plates 116 are positioned against outer surfaces of the top mounts 128, respectively, such that the frame mounting openings 122 in the rear support plates 116 are aligned with the openings 131 in the top mounts 128, respectively. Each rear support plate 116 and its associated top mount 128 are secured together by a pair of bolts 136 that extend through the aligned openings 122, 131 in the rear support plate 116 and the top mount 128.

Referring now to FIG. 4, the rear mount 110 on the engine 72 is disposed between the bottom portions 116*b* of the rear support plates 116. A pair of elastomer absorbers 140 with openings 142 (shown in phantom) extending therethrough are disposed between end surfaces of the rear mount 110 and inner surfaces of the rear support plates 116, respectively, to dampen vibration from the engine 72. It is noted that the absorbers 140 may be considered optional and may be omitted in some motorcycle models. The engine mounting openings in the rear support plates 116 and the openings 142 in the absorbers 140 are aligned with a bore 144 in the rear mount 110 so as to define a mounting passage. A bolt 146 extends through the mounting passage and is secured between the rear support plates 116, thereby securing the rear mount 110 of the engine 72 to the rear support plates 116 and, thus, the top frame structure 32. The rear support plates 116 cooperate with the rear mount 110 of the engine 72 and the top frame structure 32 to define a holding space 148 that extends laterally between the rear support plates 116 and upwardly and rearwardly between the rear mount 110 and the top frame structure 32. As will be discussed further below, the thermostat 102 is disposed in the holding space 148.

The cooling system of the motorcycle 10 includes the thermostat 102, water pump 92, a radiator 150, a fan assembly 152 and an air management system for supplying cooling air to the radiator 150.

Referring to FIGS. 1 and 2, the air management system comprises a plurality of air ducts that guide cooling air from the front of the motorcycle 10 to the rear cooling space 112 between the engine 72 and the inner fender 56. More specifically, the air management system comprises top ducts 154, a bottom duct 156, a middle duct 158 and a pair of rear ducts 160.

The top ducts 154 and the middle duct extend over the engine and define air passages extending rearward from the steering head 22 to the cooling space, or proximate to the cooling space. The middle duct 158 is secured between the top ducts 154, with the top ducts 154 being disposed on opposing sides of the longitudinal plane of the motorcycle 10 and the middle duct 158 being longitudinally divided by the longitudinal plane of the motorcycle 10. The top ducts 154 and the middle duct 158 each include an inlet and an outlet and are preferably enclosed, except for the inlets and the outlets. The top ducts 154 and the middle duct 158 may be channel-shaped, as shown, or tube shaped. If the top ducts 154 and the middle duct 158 are channel-shaped, they may have a trapezoidal cross-section, as shown. The top ducts 154 and the middle duct 158 may have a rigid or semi-rigid construction and may be composed of metal or plastic. When the top ducts 154 and the middle duct 158 help form the top frame structure 32, the top ducts 154 and the middle duct 158 have a rigid construction and are composed of a metal, such as steel. In addition, the inside walls of the top ducts 154 (toward the inlets) are joined by welding and/or other securement means to opposing sides of the steering head 22, respectively. The inlets of the top ducts 154 are disposed on opposing sides of the steering head 22, while the inlet of the middle duct 158 is disposed below the steering head 22 and is laterally aligned with a space between the down pipes 24.

The top ducts 154 and the middle duct 158 are joined together by welding or other securement means to form the duct structure 38. The duct structure 38 is joined to forward portions of the seat rails 36 by welding or other securement means. A brace (not shown) may be disposed between the seat rails 36, proximate to the juncture of the seat rails 36 and the duct structure 38, and may be secured to the seat rails 36, respectively, as well as to the duct structure 38. Together, the duct structure 38 (comprising the top ducts 154 and the middle duct 158), the seat rails 36 and the brace (if present) form the top frame structure 32. With the top ducts 154 being joined to opposing sides of the steering head 22, respectively, and the rear portions of the seat rails 36 being secured to the rear stays 30, the top frame structure 32 has a front portion secured to the steering head 22 and a rear portion secured to the rear stays 30.

With the construction described above, the top frame structure 32 forms a unique frame structure, which, in addition to being an integral portion of the front or main frame 18, functions as a conduit for conducting air from the front of the motorcycle 10 to the radiator 150.

Referring now to FIGS. 6 and 7, the radiator 150 has a rectangular shape and is preferably secured to the rear swing frame 20 by a top mounting bracket 164 and a bottom mounting bracket 166. The radiator 150, however, may instead be secured to the front or main frame 18. For example, the radiator 150 may be connected to the seat rails 36 and the bottom pipes 28. Regardless of whether the radiator 150 is secured to the rear swing frame 20 or the front or main frame 18, the radiator 150 is disposed in the cooling space 112 between the engine 72 and the inner fender 56 and is positioned so as to be below the seat 74. In addition, an uppermost portion of the radiator 150 is preferably disposed at a lower level than an uppermost portion of the rear wheel 16.

The radiator 150 includes a core 168 disposed between an inlet tank 170 and an outlet tank 172. The core 168 includes one or more sections, each of which comprises a plurality of spaced-apart tubes and corrugated cooling fins. Two core sections are currently preferred. In each section, the tubes extend vertically between the inlet and outlet tanks 170, 172 and the corrugated cooling fins are disposed between the tubes. The inlet tank 170 has an inlet 174 and the outlet tank 172 has an outlet 176.

The inlet 174 is connected to the water jackets of the front and rear cylinder heads 80, 82 through the thermostat 102, as will be described further below, while the outlet 176 is connected to an inlet of the water pump 92 by a flexible hose 178. A bottom wall (not shown) of the inlet tank 170 has openings formed therein that are connected to inlets of the tubes, while a top wall (not shown) of the outlet tank 172 has openings formed therein that are connected to outlets of the tubes. Coolant heated by the engine 72 enters the inlet tank 170 via the thermostat 102 and the inlet 174, passes through the tubes, where it is cooled, enters the outlet tank 172 and then exits the radiator 150 through the outlet 176. The fan assembly 152 helps draw air through the radiator 150 to cool the heated coolant flowing through the tubes.

The fan assembly 152 includes a mounting cage 180 that is secured to the radiator 150 and holds at least one and, preferably, a pair of fans 182. Each of the fans 182 includes an electric motor having a rotatable shaft secured to an impeller. The mounting cage 180 positions the fans 182 rearward of, and in alignment with, the core 168 of the radiator 150. The motors of the fans 182 are provided with electric power through wiring connected to an electrical power system of the motorcycle 10. Power to the motors is controlled by a thermoswitch located on the outlet tank 172 of the radiator 150. When the temperature of the coolant in the outlet tank 172 rises above a certain temperature, the thermoswitch closes and power is provided to the motors, thereby rotating the impellers and drawing air through the radiator 150.

Figure 3:
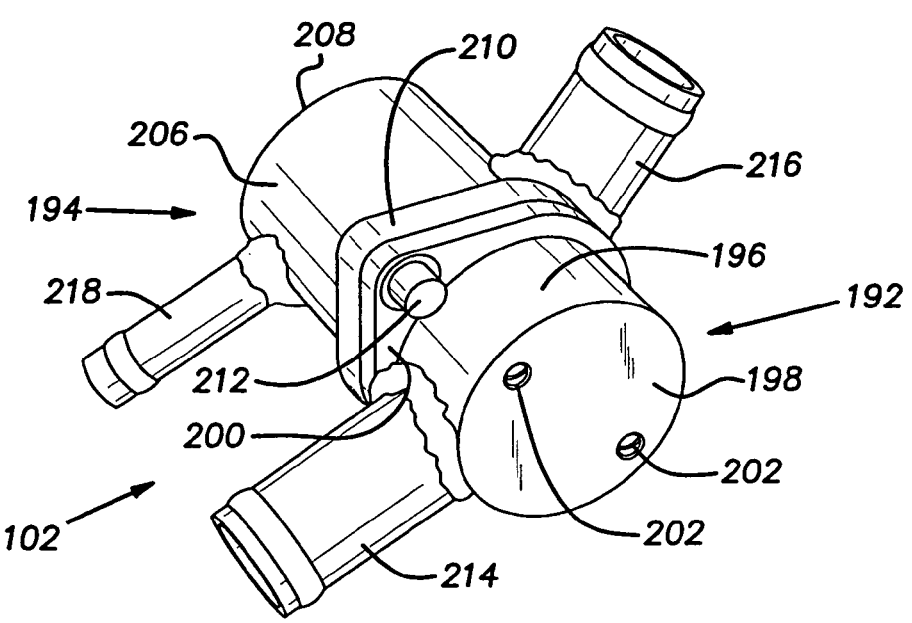
FIG. 3 is a perspective view of a thermostat of the cooling system.

The flow of coolant from the engine 72 to the radiator 150 is controlled by the thermostat 102. With reference now to FIG. 3, the thermostat 102 includes a housing 190 formed of first and second sections 192, 194.

The first section 192 includes a cylindrical side wall 196 with an outlet opening formed therein. A first end wall 198 is joined to the side wall 196 and covers an outer end of the side wall 196, while a first collar 200 is joined to the side wall 196 and extends around an open inner end of the side wall 196. A pair of threaded securement bores 202 are formed in the first end wall 198.

The second section 194 includes a cylindrical side wall 206 with inlet and bypass openings formed therein. A second end wall 208 is joined to the side wall 206 and covers an outer end of the side wall 206, while a second collar 210 is joined to the side wall 206 and extends around an open inner end of the side wall 206. A pair of threaded securement bores (not shown) are formed in the second end wall 208.

The first and second collars 200, 210 of the first and second sections 192, 194 are secured together by fasteners 212, such as bolts or screws, thereby fastening the first and second sections 192, 194 together. In the first section 192, a cylindrical outlet port 214 is joined to the side wall 196 around the outlet opening, while in the second section 194, cylindrical inlet and bypass ports 216, 218 are joined to the side wall 206 around the inlet and bypass openings, respectively. The outlet port 214 and the bypass port 218 extend outwardly from the housing 190 in about the same direction, while the inlet port 216 extends outwardly from the housing 190 in not quite the opposite direction as the outlet and bypass ports 214, 218, i.e., about 160° apart.

A valve body (not shown) is mounted inside the housing 190 and is movable between open and closed positions in response to changes in temperature of the coolant entering the inlet port 216. In the open position, the valve body creates a through passage for coolant to flow between the inlet port 216 and the outlet port 214 and blocks passage of coolant to the bypass port 218. In the closed position, the valve body creates a through passage for coolant to flow between the inlet port 216 and the bypass port 218 and blocks passage of coolant to the outlet port 214. The valve body is biased toward the closed position by a spring (not shown). The valve body moves against the bias of the spring to the open position after the temperature of the coolant entering the inlet port 216 rises above a setpoint temperature. As is conventional, the valve body may be moved to the open position as a result of the thermal expansion of a wax or a polymer disposed in the valve body.

Referring now to FIG. 4, the thermostat 102 is disposed between the rear support plates 116 that help mount the engine 72 to the front or main frame 18. The housing 190 is positioned such that the first and second end walls 198, 208 are disposed against the rear support plates 116, respectively, and such that portions of the housing 190, toward the first and second end walls 198, 208, are disposed in the recesses 134 of the top mounts 128, i.e., the top mounts 128 extend around a portion of the circumference of the housing 190, as is shown in FIG. 5. With the housing 190 so positioned, the longitudinal axis of the housing 190 extends laterally between the rear support plates 116. The housing 190 is angularly positioned relative to the longitudinal axis such that the outlet and bypass ports 214, 218 extend rearwardly and downwardly, while the inlet port 216 extends upwardly and forwardly.

The first and second end walls 198, 208 are positioned relative to the rear support plates 116, respectively, such that the securement bores 202 in the first and second end walls 198, 208 are aligned with the securement holes in the rear support plates 116, respectively. Screws 230 are threaded into the securement bores 202 through the aligned securement holes, thereby securing the first and second end walls 198, 208 to the rear support plates 116, respectively.

Although the thermostat 102 is shown and described as being secured to the rear support plates 116, it should be appreciated that the thermostat 102 may instead be secured to the top frame structure 32 or to the rear mount 110 on the engine 72. For example, the first and second collars 200, 202 of the thermostat 102 may be secured to the top mounts 128.

The outlet port 214 of the thermostat 102 is connected by a flexible hose 232 to the inlet 174 of the radiator 150, while the inlet port 216 of the thermostat 102 is connected by the hose 104 to the outlet port of the multiport connector 100 that receives coolant from the water jackets of the front and rear cylinders 80, 82. The bypass port 218 of the thermostat 102 is connected to an inlet of the water pump 92 by a flexible bypass hose (not shown).

The cooling system operates to cool the engine 72 by removing heat from the engine block and cylinder heads. However, when the engine 72 is initially started, the engine and coolant therein is cold (i.e., below the predetermined temperature at which the thermostat valve opens). Therefore, flows of coolant exit the water jackets and travel through the hoses 96, 98 to the multiport connector 100 where the flows are combined. The combined coolant flow then travels through the hose 104 to the thermostat 102 and enters the thermostat 102 through the inlet port 216. Since the coolant temperature is below the predetermined or setpoint temperature at which the thermostat valve body moves to the open position, coolant flows through the thermostat 102 and exits the thermostat 102 through the bypass port 218. The coolant returns to the water pump 92 through the bypass hose and is again pumped into the engine block water jackets surrounding the front and rear cylinders 80, 82. Accordingly, the water pump 92 recirculates coolant within the engine water jackets, bypassing the radiator 150 and permitting the engine to warm up relatively quickly.

When the engine has reached an operating temperature, the coolant leaving the engine block is above a predetermined temperature at which the thermostat valve opens and, accordingly, the thermostat valve moves to permit fluid communication to the radiator 150. Thus, the water pump 92 draws coolant from the radiator 150 through the hose 178 and pumps the coolant through the hose 94 into the water jackets surrounding the front and rear cylinders 80, 82. Heat from the engine block 84 and cylinder heads 80a, 82a is transferred to the coolant flowing in the water jackets. The heated coolant leaves the engine block water jackets and flows to the thermostat 102. Since the temperature of the heated coolant entering the thermostat 102 exceeds the setpoint temperature, the thermostat valve body moves to the open position. When this occurs, the heated coolant moves through the thermostat 102 from the inlet port 216 to the outlet port 214 and then travels to the radiator 150 through the hose 232. In the radiator 150, the heated coolant is cooled and then returned to the water pump 92 through the hose 178.

With the thermostat 102 disposed between the rear support plates 116 in the manner described above, the thermostat 102 is substantially concealed from view, especially when the motorcycle 10 is viewed from a lateral direction. In addition, the angular positioning of the inlet, outlet and bypass ports 216, 214, 218 helps the routing of the hoses 104, 232 and the bypass hose so that they are only minimally visible. More specifically, the inlet port 216 extends upwardly and forwardly, which facilitates the routing of the hose 104 upwardly and forwardly along the top frame structure 32, where the hose 104 is mostly concealed from view, whereas the outlet port 214 and the bypass port 218 extend downwardly and rearwardly, which facilitates the routing of the hose 232 and the bypass hose through the cooling space 112 and inward of the rear ducts 160, where they are mostly concealed from view. Thus, the mounting of the thermostat 102 between the rear support plates 116 helps provide the motorcycle 10 with a clean and uncluttered appearance.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A motorcycle comprising:
   front and rear wheels;
   a chassis supported on and connected to the front and rear wheels;
   an engine mounted to the chassis and having at least one cylinder head joined to an engine block;
   at least one mounting assembly for mounting the engine to the chassis, said at least one mounting assembly comprising a pair of laterally spaced-apart support plates secured between the engine and the chassis, said support plates being disposed rearward of the rearward most one of the at least one cylinder head;
   a radiator mounted to the chassis; and
   a thermostat connected between the engine and the radiator and operable to control coolant flow from the engine to the radiator, said thermostat being disposed between the support plates.

2. The motorcycle of claim 1, wherein the thermostat includes a housing having a longitudinal axis that extends between the support plates.

3. The motorcycle of claim 2, wherein the thermostat is secured to the support plates.

4. The motorcycle of claim 3, wherein the chassis comprises a front frame that includes:
   a steering head;
   a pair of spaced-apart down pipes joined to the steering head and extending downwardly therefrom;
   a pair of bottom pipes joined to the down pipes and extending rearwardly therefrom; and
   a top frame structure secured to the steering head and extending rearwardly therefrom.

5. The motorcycle of claim 4, wherein the support plates are secured to the top frame structure and extend downwardly therefrom.

6. The motorcycle of claim 5, wherein the at least one mounting assembly further comprises a rear mount that is joined to the engine block and extends upwardly from the engine block.

7. The motorcycle of claim 6, wherein the support plates have lower portions secured to the rear mount and disposed on opposing sides of the rear mount.

8. The motorcycle of claim 4, wherein the radiator is disposed rearward of the engine.

9. The motorcycle of claim 8, wherein the chassis comprises a rear swing frame pivotally mounted to the front frame.

10. The motorcycle of claim 9, wherein the radiator is mounted to the rear swing frame.

11. The motorcycle of claim 1, wherein the at least one cylinder head comprises front and rear cylinder heads.

12. The motorcycle of claim 1, wherein the at least one mounting assembly comprises a front mounting assembly and a rear mounting assembly, and wherein the rear mounting assembly comprises the rear mount and the support plates.

13. A motorcycle comprising:
front and rear wheels;
a chassis supported on and connected to the front and rear wheels, said chassis comprising:
a steering head;
a pair of spaced-apart down pipes joined to the steering head and extending downwardly therefrom;
a pair of bottom pipes joined to the down pipes and extending rearwardly therefrom;
a top frame structure secured to the steering head and extending rearwardly therefrom;
a pair of rear stays connected the bottom pipes and the top frame structure;
an engine mounted to the chassis between the bottom pipes and the top frame structure, said engine having at least one cylinder head and a rear mount joined to an engine block, said rear mount extending upwardly from the engine block and being disposed rearward of the rearward most one of the at least one cylinder head;
a pair of laterally spaced-apart support plates for helping mount the engine to the chassis, said support plates being secured to the top frame structure and extending downwardly therefrom, said support plates having lower portions secured to the rear mount and disposed on opposing sides of the rear mount, wherein said support plates cooperate with the rear mount and the top frame structure to define a holding space that extends between the support plates and between the rear mount and the top frame structure;
a fuel tank disposed over and supported by the top frame structure; and
a radiator mounted to the chassis; and
a thermostat connected between the engine and the radiator and operable to control coolant flow from the engine to the radiator, said thermostat being disposed in the holding space.

14. The motorcycle of claim 13, wherein the radiator is disposed rearward of the engine.

15. The motorcycle of claim 14, wherein the thermostat includes a housing having a longitudinal axis that extends between the support plates.

16. The motorcycle of claim 15, wherein the thermostat is secured to the support plates.

17. The motorcycle of claim 15, wherein the top frame structure comprises a pair of seat rails secured to a duct structure, said duct structure comprising at least one air duct for guiding cooling air to the radiator, said at least one air duct extending over the engine and having an inlet located at about the steering head and an outlet positioned to permit exiting air to communicate with the radiator.

18. The motorcycle of claim 17, wherein the chassis further comprises a rear swing frame pivotally mounted to the rear stays.

19. The motorcycle of claim 18, wherein the radiator is mounted to the rear swing frame.

20. The motorcycle of claim 13, wherein the at least one cylinder head comprises front and rear cylinder heads.

\* \* \* \* \*